(12) United States Patent
Tamizkar

(10) Patent No.: US 11,329,917 B2
(45) Date of Patent: May 10, 2022

(54) METHODS AND APPARATUSES FOR SWITCHING FRAMES IN A NETWORK TOPOLOGY

(71) Applicant: Telia Company AB, Solna (SE)

(72) Inventor: Babak Tamizkar, Stockholm (SE)

(73) Assignee: TELIA COMPANY AB

( * ) Notice: Subject to any disclaimer, the term of this patent is extended or adjusted under 35 U.S.C. 154(b) by 197 days.

(21) Appl. No.: 16/742,011

(22) Filed: Jan. 14, 2020

(65) Prior Publication Data

US 2020/0236044 A1 Jul. 23, 2020

(30) Foreign Application Priority Data

Jan. 17, 2019 (SE) .................................... 1950056-0

(51) Int. Cl.
*H04L 12/741* (2013.01)
*H04L 45/74* (2022.01)
*H04L 101/622* (2022.01)

(52) U.S. Cl.
CPC .......... *H04L 45/74* (2013.01); *H04L 61/6022* (2013.01)

(58) Field of Classification Search
CPC ............................ H04L 45/74; H04L 61/6022
USPC ........................................ 370/351, 389, 392
See application file for complete search history.

(56) References Cited

U.S. PATENT DOCUMENTS

| | | |
|---|---|---|
| 2007/0177597 A1 | 8/2007 | Ju |
| 2007/0217364 A1* | 9/2007 | Kawakami .......... H04L 12/4679 370/331 |
| 2008/0008182 A1* | 1/2008 | Deng .................. H04L 12/4625 370/392 |
| 2008/0247399 A1 | 10/2008 | Hazard |
| 2010/0098073 A1 | 4/2010 | Tanaka et al. |
| 2011/0317703 A1 | 12/2011 | Dunbar et al. |

(Continued)

FOREIGN PATENT DOCUMENTS

WO  WO2017/152563 A1  9/2017

OTHER PUBLICATIONS

Office Action and Search Report, Application No. 1950056-0, dated Jan. 17, 2019, Swedish Patent and Registration Office, Stockholm, Sweden.

(Continued)

*Primary Examiner* — Obaidul Huq
(74) *Attorney, Agent, or Firm* — Burr & Forman LLP; Jeffrey H. Kamenetsky

(57) ABSTRACT

There are provided methods and apparatuses for switching frames. A method includes receiving a frame from a source host node, wherein the frame includes a Layer 2 broadcast address for retrieving a MAC address of a destination host node and the frame further includes an original source MAC address of the source host node; generating a new MMSP MAC address which is associated with said original source MAC address; generating an individual MMSP unicast address including an individual switch ID; replacing the destination MAC address indicated in the frame with the individual MMSP unicast address; replacing the original MAC address indicated in the frame with said new MMSP MAC address to generate, a new frame including the individual MMSP unicast address and the new MMSP MAC address of the source the host node; and forwarding each new generated frame to every switch.

8 Claims, 3 Drawing Sheets

(56) References Cited

U.S. PATENT DOCUMENTS

| | | |
|---|---|---|
| 2012/0044837 A1 | 2/2012 | Fernandez et al. |
| 2012/0051252 A1* | 3/2012 | Iwao .................. H04L 45/18 |
| | | 370/252 |
| 2014/0044126 A1 | 2/2014 | Sabhanatarajan |
| 2018/0091446 A1 | 3/2018 | Zhang et al. |
| 2019/0058692 A1* | 2/2019 | Mittal ............... H04L 12/4633 |

OTHER PUBLICATIONS

Extended Search Report, Application No. 20151472.6, dated Apr. 1, 2020, European Patent Office, Munich, Germany.

* cited by examiner

METHODS AND APPARATUSES FOR SWITCHING FRAMES IN A NETWORK TOPOLOGY

TECHNICAL FIELD

The present disclosure relates to the field of data communications, and in particular to methods and apparatuses in the form of switching devices or switch devices for switching (data) frames in in a network topology.

BACKGROUND

Switching is an approach of delivering data frames across the network. Switching methods decide how a switch device receives, processes, and forwards the frames. A hub device and a repeater device work at Layer 1 (Physical Layer). These devices only understand the signals. Signals received on an incoming port are forwarded from all available ports except the receiver port.

A switch device works at Layer 2 (Data Link Layer). A switch is capable to read frames. Switching is a method of dealing with frames. Switching is described in Layer 2 (L2) of the OSI model. When a data frame enters into a port of the switch device, the switch device checks the FCS (Frame Checksum Sequence) field of the data frame and processes it only if it is valid. All invalid data frames are automatically dropped. All valid data frames are processed and forwarded to their destination MAC (Medium or Media Access Control) address.

A switch device performs three main tasks:
Learn where devices are located and store their location (addresses) in a MAC table.
Forward a frame intelligently based on a MAC address of a data frame.
Remove Layer 2 loops.

A challenge in switching technology is "loop prevention". Having a loop in the L2 domain may cause a severe issue and bring down the network quickly. There are three main issues when there is a loop in a L2 network:
1) Broadcast/Unknown-unicast storm
2) Frame duplication
3) MAC address table corruption Loop Prevention by STP or TRILL/FabricPath STP (Spanning Tree Protocol) is a traditional loop prevention mechanism. The main concept of STP is to find the loop in a network and disable as many links to make the loop free. STP solves the loop issue but it is not efficiently enough.

First: As STP disables one or more links to avoid the loop one loses some part of the bandwidth. And also, there is no load balancing.
Second: STP is slow in recovering network issues if any changes happen to network.

Besides these two main issues, STP is more complex in complex networks.

In comparing with STP, TRILL (TRansparent Interconnection of Lots of Links) operates much more efficiently.

TRILL is an IETF standard. In TRILL all available links are active and operational and because of that, there is no waiting time in services if any port goes down. TRILL also supports EMCP (Equal-Cost Multi-Path routing).

In order to implement TRILL, a special routing protocol called IS-IS (Intermediate System to Intermediate System) is needed to be run over the network. After IS-IS creates its topology to specify what is the best path between any two switches in the network, switches or switch devices can send the frame between each other with no risk of getting stuck in an unlimited loop. However, every single frame needs to be encapsulated with a IS-IS header in order to traverse throughout the network. The reason for that is that in this technique frames get routed between a source and a destination switch. This routing is operated by IS-IS and because IS-IS is a routing protocol it needs a source and a destination address which is separate with from the MAC address, the standard frame is encapsulated by the IS-IS header.

Drawback of TRILL/FabricPath:

Actually, this encapsulation/de-encapsulation has its own overhead and issue on switches. Besides that, the frame size also increases. The lookup process for MAC (Medium Access Control) address and switch ID is also extensive. Besides all of these issues, the MAC address entries in a MAC address table is also extensive especially in a datacenter with thousands of hosts and in some scenarios millions. There are some techniques to improve this, but they are not efficient enough.

In view of the above, there is a need for methods and apparatuses for switching frames in a network topology or a network domain that solve at least some of the problems described above.

SUMMARY

It is therefore an object of embodiments herein to solve the above problems by providing methods and apparatuses in the form of a switch devices.

According to an aspect of embodiments herein there is provided a method performed by/in a source switch device for switching frames in a network topology comprising a plurality of switch devices, the method comprising: receiving a frame from a source host node connected to the source switch device, wherein the frame or the data frame includes a Layer 2 broadcast address for retrieving a MAC address of a destination host node connected to a destination switch device and the frame further includes an original source MAC address of the source host node; generating a new MMSP MAC address for the source host node, wherein said new MMSP MAC address is associated with said original source MAC address of the source host node. MMSP is referred to here as Mapped MAC Switching Protocol. The method further comprises: for each switch device in the network domain, generating an individual MMSP unicast address including an individual switch ID (Identification number or Identity) wherein the individual MMSP unicast address is unique for each switch device in the network domain. The method further comprises, for each switch device, replacing the Layer 2 broadcast address indicated in the frame with the individual MMSP unicast address of said each switch generated in the previous step; for each switch device, replacing the original MAC address of the source host node indicated in the frame with said new generated MMSP MAC address of the source host node generated in the previous step to generate, for each switch device, a new frame including the individual MMSP unicast address and the new generated MMSP MAC address of the source the host node; and forwarding each new generated frame to every switch in the network domain or network topology.

According to another aspect of exemplary embodiments herein, there is provided a method performed by a transit switch device for switching frames in a network domain including a plurality of switch devices, the method comprising receiving a frame generated according to previously described aspects. If the individual switch ID indicated in the received frame does not match the switch ID of the switch device receiving the frame, decrementing a destination MAC address destination's Time-to-Live (TTL) entry and updating a FCS (Frame Check Sequence) field, and forwarding the frame towards the destination switch having the same switch ID as the switch ID indicated in the received frame.

According to another aspect of exemplary embodiments herein, there is provided a method performed by a destination switch device for switching frames in a network domain including a plurality of switch devices, the method comprising: receiving, by the destination switch device, a frame generated according to previously described aspects herein. If the individual switch ID indicated in the received frame does match the switch ID of the switch receiving the frame; the method further comprises replacing the individual MMSP MAC address field in the received frame with a standard broadcast MAC address; and flooding the frame including the standard broadcast MAC address and the MMSP MAC address of the source host node to all host nodes connected to the destination switch device.

According to another aspect herein, there is provided a source switch device comprising a processor and a memory, said memory containing instructions executable by said processor whereby said source switch device is operative to perform the subject-matter of any of claims 1-2.

According to another aspect herein there is provided a transit switch device comprising a processor and a memory, said memory containing instructions executable by said processor whereby said transit switch device is operative to perform the subject-matter of claim 3.

According to yet another aspect, there is provided a destination switch device comprising a processor and a memory, said memory containing instructions executable by said processor whereby said destination switch device is operative to perform the subject-matter of any of claims 4-6.

Several advantages are achieved by the embodiments herein employing the innovative MMSP and which include:
- MMSP uses a standard model of a frame. No additional field or header is needed. So it causes less bandwidth usage in a domain and less process on a switch.
- MMSP MAC address learning method is new by introducing "No MAC Address Learning for Remote Hosts." MAC address learning is a really challenge for all switching techniques. We know that in standard switching MAC address learning process, switches have to learn the source MAC address of all incoming frames either locally or at remote hosts. Also, all switches in the network should know about all available MAC addresses in the network domain. It is more or less the same in FabricPath or in the Cisco ACI fabric method. But in MMSP, the MAC address learning is performed just for local hosts when a frame arrives from an edge port. So there is no need at all for any switches in the network to keep the record for any remote host's MAC address in its MAC address table. It means significantly less process and resource usage and a much more faster transmission.
- We know that in a standard switching procedure, a MAC address lookup for a destination host is mandatory. Even in the FabricPath technology, the source switch, before it wants to send a frame towards a destination host, needs to look up the destination switch ID and the destination "local-ID" (edge port number for destination host). But in MMSP, since all the information including the destination switch-ID and the destination port number is already part of the destination MAC address, there is no need for any lookup process and the frame is sent out directly. Again, a faster process and transmission is achieved by the MMSP.
- The searching MAC address table is also improved in MMSP. In current methods, since it is not possible to keep the MAC address entries in the table in a structured way, a top-to-bottom search has to be done to find a MAC address in the table. However, in MMSP, by having the "port number" field, the search mechanism significantly improves by seeking directly to the specific section. Again, this achieves a faster process.
- Another advantage in MMSP is that for those MAC addresses that have a Mapped-MAC address, there is no need to have a "Port Number" entry in the MAC address table. Hence, the MMSP method as provided in this disclosure requires less usage of resources.
- It's true that MMSP uses a new field in a MAP-MAC address table. But still in comparison with other switching techniques, it uses less resources, especially when there is no need to have a record for remote hosts.
- MMSP uses less process/resources when compared with FabricPath. MMSP has its own process to generate, associate, and replace the MMSP MAC address.
- FabricPath also has to keep some additional information for each destination host like a remote switch ID, a subswitch ID, a local ID, a port number and so on while in MMSP all this information is already part of the MMSP MAC address which means less usage of resources.
- There is no real broadcast frame anymore in the MMSP domain even for ARP (Address Resolution Protocol).

Additional advantages achieved by the embodiments herein will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Hereinafter are described, according to embodiments herein, methods and apparatuses for switching frames. The method(s) may be referred to as MMSP which stands for Mapped Media access control Switching Protocol.

The main purpose of the MMSP implementation is to use a frame in standard format with no additional header or label.

The way MMSP operates is to generate a new MAC address, associate this new MAC address to the original source MAC address of the frame, and replace this new one with the original one before forwarding the frame.

This new generated MAC address has a specific structure that makes the frame unique and routable by any switch in the network. This address may be viewed as unicast address.

Some main points of MMSP compared to TRILL/FabricPath are:
1) MMSP uses a standard Ethernet (data) frame format. It means no additional header is needed.
2) Contrary to all current switching methods, every switch in MMSP just needs to keep a local host's MAC address in its MAC address table. It means there is no MAC address learning for any remote hosts.

Figure 1:
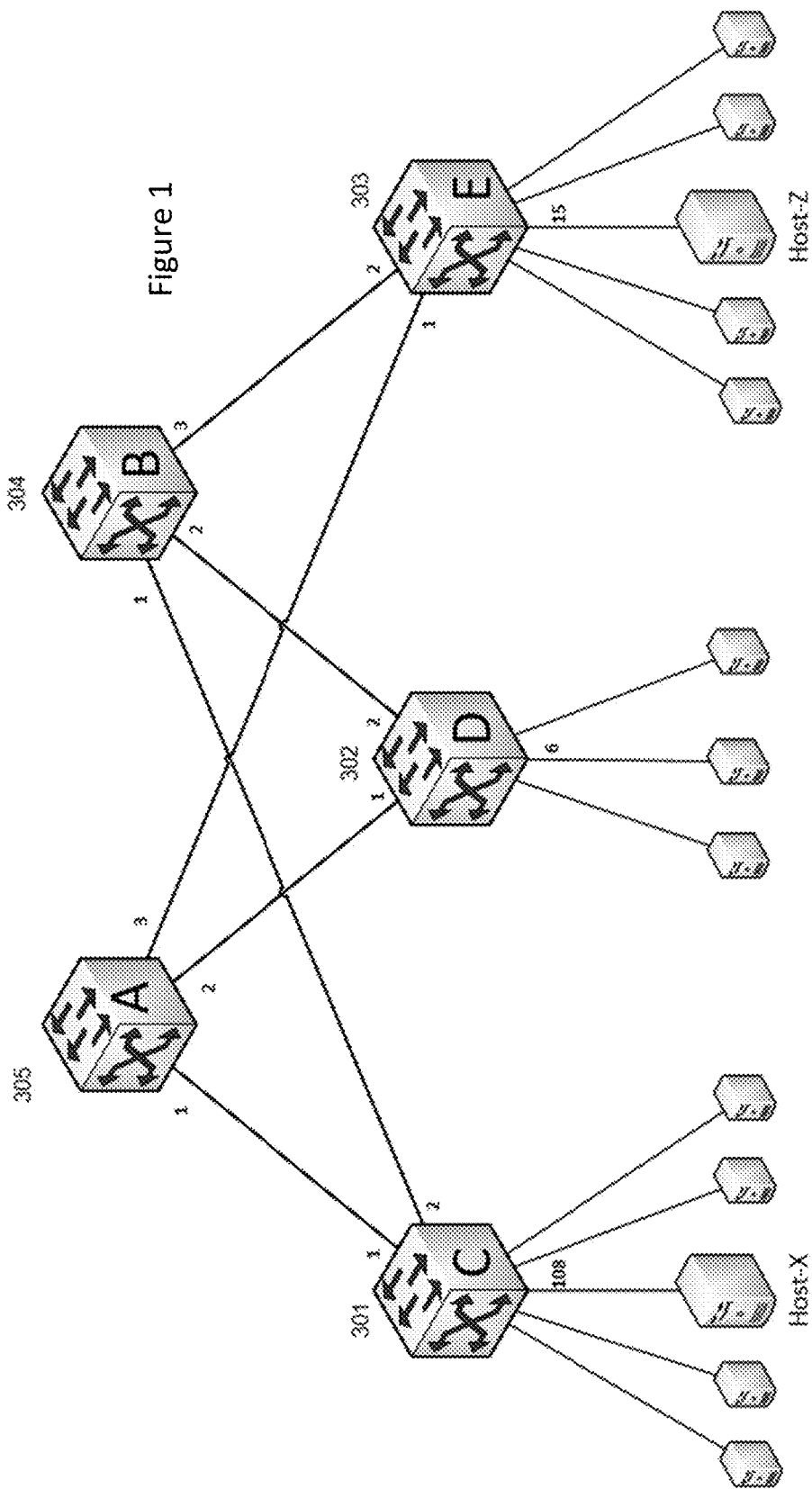
FIG. 1 is an example of a network topology employing embodiments herein.

Referring to FIG. 1, there is illustrated a plurality of switch devices A-E 301-305 and host devices, e.g., Host-X and Host-Z although additional host devices are shown. The network domain or network topology or MMSP domain also schematically depicts some interface or port numbers. For example, Switch device C has interface or port numbers 1-2 connecting to Switch A and Switch B respectively. Host-X is connected to port number 108 of Switch C and Host-Z is connected to port number 15 of Switch E. The network domain may be referred to as a MMSP domain and each switch device is hereinafter denoted a MMSP Switch device. A source switch device may be referred to as a MMSP source switch or MMSP source switch device. A transit switch may be called a MMSP transit switch or a MMSP transit switch device and a destination switch device may be referred to as a MMSP destination switch or a MMSP destination switch device.

Below are presented MMSP's keywords according to exemplary embodiments herein with reference to FIG. 1.
MMSP Domain: A boundary of a Layer two (L2) network that uses an instance of MMSP. It includes two or more MMSP switches with their physical connection.
MMSP Switch: Those switch devices in the MMSP domain that have the same instance of an MMSP enabled on them. SW-A 305, SW-B 304, SW-C 301, SW-D 302, and SW-E 303 are examples of MMSP switch devices.
MMSP Transit Switches: All those switches in the MMSP network between a source and destination switch that just forward the frame toward its final destination.
MMSP port: Those switch ports of a MMSP switch which are connected to another MMSP switch. For instance, port 1 and 2 on SW-C.
Edge Port: All MMSP's switch ports which are not connected to any other MMSP switches. For instance, on SW-C 301 all ports except port 1&2, e.g., port 108.
Mapped-MAC Address Table: It is very similar to a standard MAC Address Table with just one additional field named MAP MAC. MMSP uses this table instead of a standard MAC Address Table.
MMSP MAC Address: This is a new field by MMSP according to embodiments herein. It may replace the original source or destination MAC address of the frame based on the situation.

Structure of MMSP's MAC Address:
First let us take a quick look at a structure of a standard MAC address. We know that the standard MAC address is a unique 48-bit data which is divided into two 24-bit parts. The first 24-bit part is a unique ID assigned by IEEE to each manufacture of NIC (Network Interface Controller or Network Interface Card). It known as OUI (Organizationally Unique Identifier).
The second 24-bit is assigned by each vendor internally. This part is locally significant to the vendor. The combination of these two 24-bit parts make the MAC address unique.
As MMSP is supposed to use a standard frame and it is supposed to replace its own MAC address with the original MAC address of the frame, this MMSP MAC address also should be unique at least in the MMSP domain. Here is the detailed structure of a MMSP MAC address:

| MMSP MAC Address 48-bit | | | | |
|---|---|---|---|---|
| 8-bit MMSP Indicator | 6-bit TTL | 9-bit SW-ID | 10-bit Edge Port No. | 15-bit Sub-MAC |
| FF(Hex) | "0-62" | "0-510" | "0-1022" | "0-32766" |

The first 15-bits (on the right) is a unique locally significant number generated by a switch. We name it here Sub-MAC. This field can address more than 32,000 hosts which somehow is more than usual as we don't expect (an example) to have this number of hosts connected to a single edge port. However, any number of hosts may be used. Even if we have more than this then the new entry in a MAC address table can get replaced with the old ones which is normal behavior of MAC address table.
The next 10-bits indicates the edge port number from which the frame arrived. This is also addressing more than 1000 ports which is enough as we don't expect to have more than 1000 physically connected ports to a switch. Note again that this number could be more or less than 1000.
The next 9-bits indicates the ID of the switch (SW device). This is a unique number in the whole MMSP domain. This field also can address more than 500 switches which is more than enough as no network uses this number of connected switches in an L2 domain. Also, this number can take any value.
The next 6-bits indicate the TTL. The reason for this option is to secure that a frame cannot stuck in a loop by IS-IS.
The last 8-bits are fixed with FF (hexadecimal). Such a structure for MMSP MAC address allows generating a unique MAC, but these new generated MAC should not have any similarity with any other host's MAC address.
"FF" is a reserved field in the standard MAC address and there is no unicast MAC address that starts with "FF". By having this field, MMSP makes sure that this new generated MAC address does not have any similarity with any other host's MAC address in network.
It should be noted that the other field in the MMSP MAC address is never set all to "F" which means there is no possibility to have a MAC address in MMSP with all bits set to F. And that makes a difference between the MMSP MAC address format and a standard broadcast address.
Also note that MMSP MAC structure is flexible based on usage. We can also use any other entry from "Unassigned" standard range instead of FF to indicate the MMSP field.

Figure 2:
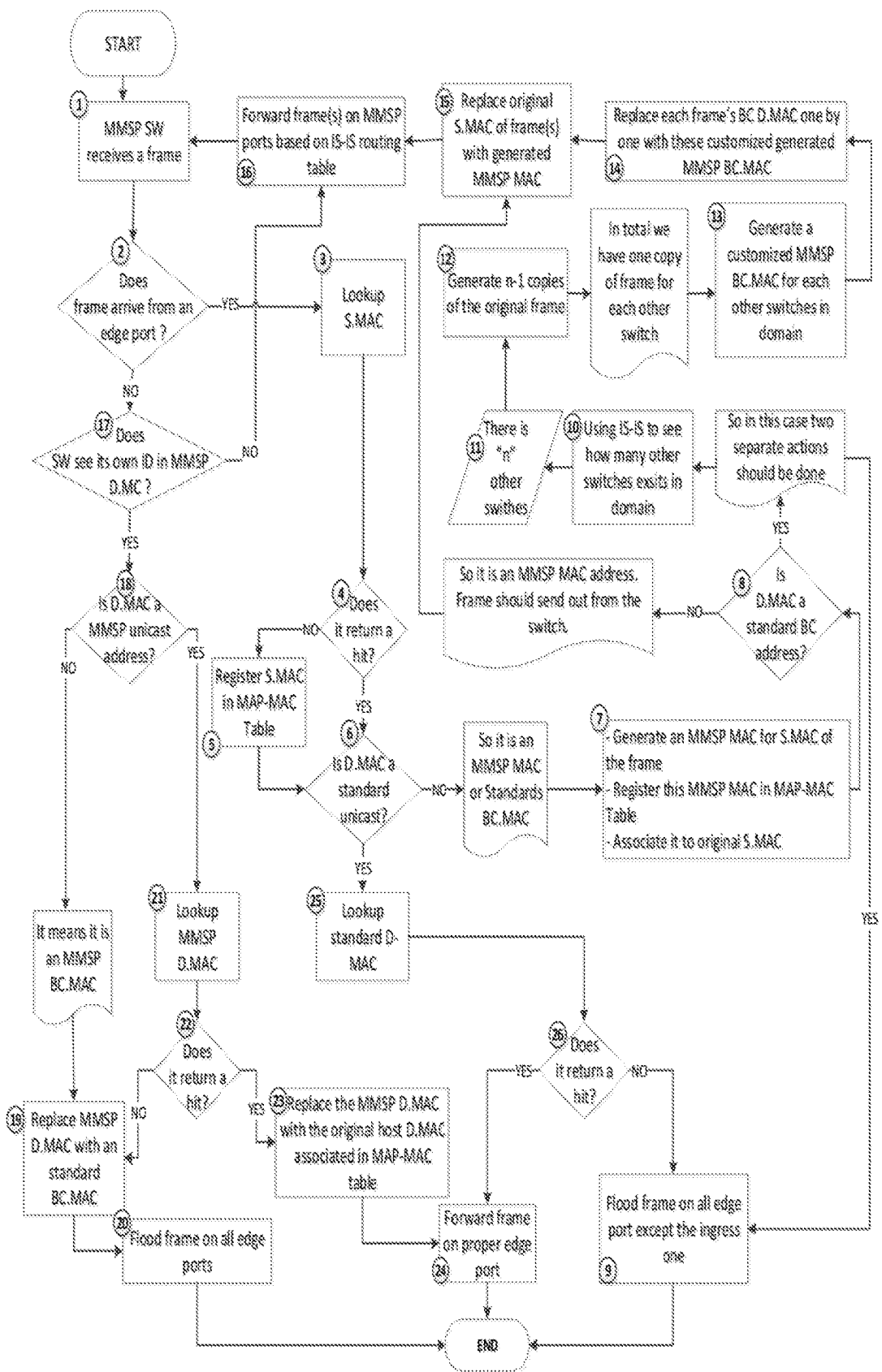
FIG. 2 is a flowchart of methods according to embodiments herein.

Below is described the MMSP process or method:
With reference to FIG. 2 there are illustrated MMSP's steps according to exemplary embodiments herein:
For more understanding and in order to cover situations based on FIG. 1 and FIG. 2, we consider that this is a fresh network. It means that none of the hosts has any entry in their local ARP cache and none of the switches has any entry in their MAP-MAC address table.
Host-X wants to send an ARP request or a Layer 2 broadcast address for retrieving a MAC address of a destination host node connected to a destination switch device to find out the Host-Z's MAC address and then Host-Z sends an ARP reply back to Host-X.

1. A unique 8-bit ID is assigned to each switch device. It can be done automatically or manually.
2. IS-IS as an L2 routing protocol that runs over the network on all MMSP switches to form IS-IS adjacencies between them. Now, every single switch knows how to reach to any other switch using the in best path.
3. Host-X (source host device) wants to communicate with Host-Z (destination host device) in the same IP subnet. Host-X sends out an ARP request (or a layer 2 broadcast address as previously described) as a standard Ethernet frame with source MAC address of xx:xx:xx:xx:xx:xx and destination MAC address of FF:FF:FF:FF:FF:FF.
4. SW-C (source MMSP switch) receives the frame (1) on its edge port number 0.108 (2) and look up the source MAC address of the frame on its MAP-MAC table (3). It returns a miss (4) which causes SW-C to learn Host-X's MAC (5).
5. The destination MAC address of the frame is not a standard unicast address (6) so SW-C (7):
   Generates a new source MMSP MAC address.
   Registers a new MMSP MAC address into its MAP-MAC address table.
   Associates the new MMSP MAC address to the original source MAC of the frame
6. As this is a standard broadcast (8) this causes SW-C to flood the frame out on all ports except the ingress one. But in this step flooding by a MMSP switch has two parts:
a. Flooding on edge ports is done by SW-C with no change to the frame (9).
b. Flooding on MMSP ports is different (10-13). SW-C should flood the frame to all other switches in the network. SW-C does this by sending a unicast message to every other MMSP switches in the network. For doing this, SW-C creates individual copies of the frame for each other MMSP switch and forward those frames as unicast frames. But these new frames use the new individual MMSP destination MAC address (14) as the new destination MAC address in the frame and uses the new generated source MMSP MAC as the source MAC address (15).
7. Then SW-C forwards these frames toward destinations based on switches IS-IS routing table (16).
8. All transit switches that receive the frame (1-2) and does not see their switch ID inside the destination MAC address field (17) forward the frame until it reaches to the destination switch. As an example, we look at the frame which arrived to SW-E.
   We can see there is no MAC address learning for Host-X in any transit switch.
9. SW-E (destination switch) receives the frame (1) from an MMSP port (2) and sees its own ID inside the frame, i.e., the destination MAC address field of the frame (17).
   We can see that there is no MAC address learning for Host-Z either here.
10. Destination MAC address is not an MMSP unicast (18). So, it is an MMSP broadcast MAC. In this case SW-E replaces the MMSP broadcast MAC address of the frame with a standard broadcast MAC address FF:FF:FF:FF:FF:FF (19).
11. Then the switch floods the frame on all its edge ports (20).
12. Host-Z receives the frame and generates a unicast ARP reply to Host-X.
13. SW-E receives this frame (1) and as the frame arrived from an edge port (2) SW-E does a lookup for source MAC address of the frame (3)
14. As it returns a miss (4), the switch registers the source MAC address of the frame in its MAP-MAC table (5)
15. SW-E looks at the destination MAC address of the frame and as it is not a standard unicast address (6), SW-E generates a new source MAC address for Host-Z and registers this MAC in its MAP-MAC table and associates it with the original MAC address of Host-Z which is already registered (7).
16. As the destination MAC address of the frame is an MMSP MAC (8), the switch needs to replace the original source MAC address of the frame with the generated source MMSP MAC address (15) and then the frame is sent out from the switch (16).
17. The switch forwards the frame toward the destination by using it IS-IS routing table (16). Any transit switch that receives the frame (1)(2) and cannot see their IDs inside the destination MAC address field (17), forwards the frame based on their IS-IS routing protocol (16) to deliver the frame to the right destination switch which is SW-C (17)
18. SW-C receives the frame and as it sees its ID inside the Layer 2 broadcast address field of the frame (17) it checks to see if the destination MAC address of the frame is an MMSP unicast or not (18).
19. As the answer is yes, the switch looks for the destination MMSP MAC address of the frame on its MAP-MAC address table (21). It returns a hit (22).
   It should be noted that the switch device uses the port number field inside the destination MAC address of the frame as an index to seek directly to the proper section in the MAP-MAC address table for faster search.
20. SW-C replaces the MMSP destination MAC address of the frame with the original MAC address of Host-X by using the MAP-MAC table (23).
   We can see that there is no MAC address learning for Host-Z either here.
21. At the last step, SW-C forwards the frame out on port 108 (24).

How MMSLP works in detail:

Again, based on FIG. 1 and FIG. 2, we consider this is a fresh network. It means none of hosts has any entry in their local ARP cache and none of switches have any entry in their MAC address table.

So we look at the situation when HoST-X wants to communicate with HoST-Z starting by sending an ARP request to find out the HoST-Z' MAC address. In Following Host-Z does an ARP reply to HoST-X.

Step 1: IS-IS Makes the Best Path Routing Table Between MMSP Switches

This step is exactly the same as the way that FabricPath makes their best path routing tables but with one difference. The switch ID used herein, in accordance with an exemplary embodiment, is still unique but it is a simple 9-bits number. Later we explain how we use this ID in the frame structure.

We assume that the switch ID for each switch in MMSP domain is as below:

SW-A: 305
SW-B: 304
SW-C: 301
SW-D: 302
SW-E: 303

So, after all switches in the domain form IS-IS adjacencies, each switch has its own table which shows what is the best path to reach to every other switch. We know that IS-IS can keep up to 16 different equal paths between two switches and that's why it can do the ECMP (equal cost multi path). But for simplicity we just show a maximum of two possible equal paths. We also use the number of hops to indicate the cost.

Based on our topology the IS-IS tables are as follows:

| IS-IS Table "SW-A" | | | |
|---|---|---|---|
| Alias | Destination SW-ID | Port | Cost |
| SW-B | 304 | 1 | 2 |
|  |  | 2 | 2 |
| SW-C | 301 | 1 | 1 |
| SW-D | 302 | 2 | 1 |
| SW-E | 303 | 3 | 1 |

| IS-IS Table "SW-B" | | | |
|---|---|---|---|
| Alias | Destination SW-ID | Port | Cost |
| SW-A | 305 | 1 | 2 |
|  |  | 2 | 2 |
| SW-C | 301 | 1 | 1 |
| SW-D | 302 | 2 | 1 |
| SW-E | 303 | 3 | 1 |

| IS-IS Table "SW-C" | | | |
|---|---|---|---|
| Alias | Destination SW-ID | Port | Cost |
| SW-A | 305 | 1 | 1 |
| SW-B | 304 | 2 | 1 |
| SW-D | 302 | 1 | 2 |
|  |  | 2 | 2 |
| SW-E | 303 | 1 | 2 |
|  |  | 2 | 2 |

| IS-IS Table "SW-D" | | | |
|---|---|---|---|
| Alias | Destination SW-ID | Port | Cost |
| SW-A | 305 | 1 | 1 |
| SW-B | 304 | 2 | 1 |
| SW-C | 301 | 1 | 2 |
|  |  | 2 | 2 |
| SW-E | 303 | 1 | 2 |
|  |  | 2 | 2 |

| IS-IS Table "SW-E" | | | |
|---|---|---|---|
| Alias | Destination SW-ID | Port | Cost |
| SW-A | 305 | 1 | 1 |
| SW-B | 304 | 2 | 1 |
| SW-C | 301 | 1 | 2 |
|  |  | 2 | 2 |
| SW-D | 302 | 1 | 2 |
|  |  | 2 | 2 |

Step 2: Tracing End-to-End Transmission of a Frame

In order to have a clear understanding about how MMSP works, a step by step procedure is explained by tracking an ARP request generated from Host-X to Host-Z and a transmission of the ARP reply from Host-Z to Host-X.

Phase 1: Generating an ARP Request by Host-X for Host-Z

As we assumed that this is a fresh network, it is the first time Host-X wants to contact Host-Z. So Host-X does not know the MAC address of Host-Z. None of the switches in the network knows about Host-Z. So, as a start, Host-X generates a standard ARP request to find out Host-Z's MAC address and sends the frame out. The L2 part of the frame looks like this:

| L2 | |
|---|---|
| Destination MAC | Source MAC |
| FF:FF:FF:FF:FF:FF | xx:xx:xx:xx:xx:xx |

Phase 2: SW-C Receives a Broadcast (ARP Request) Frame

The ARP request frame reaches to SW-C (1) from an edge port (2). The switch does a lookup for the source MAC address of the frame (3) and as this is a fresh network the result returns a miss (4). So the source MAC address should be registered in the MAP-MAC table (5).

SW-C's MAP-MAC address table is updated as below:

| SW-C MAC address Table | | |
|---|---|---|
| Port | Original MAC | MAP MAC |
| 108 | xx:xx:xx:xx:xx:xx |  |

Phase 3.1: Generating a New Source MMSP's MAC Address:

Because the destination MAC address of the frame is not a standard unicast address (6), SW-C generates a new source MMSP MAC address for Host-X, associates it to the original MAC address of Host-X by registering it in its MAP-MAC table (7). This new source MMSP MAC will be used later.

Let's see how SW-C generates this new source MMSP MAC address based on the Host-X' MAC address. For simplicity we show the numbers in decimal format.

| MMSP MAC Address 48-bit | | | | |
|---|---|---|---|---|
| 8-bit MMSP Indicator | 6-bit TTL | 9-bit SW-ID | 10-bit Edge Port No. | 15-bit Sub-MAC |
| FF(Hex) | 62 | 301 | 108 | 1 |

Phase 3.2: Register New Source MAC Address in the MAC Table

This generated MMSP MAC address should be associated to Host-X's MAC address by registering it in MAP-MAC Table:

| SW-C MAP-MAC address Table | | |
|---|---|---|
| Port | Original MAC | MAP MAC |
| 108 | xx:xx:xx:xx:xx:xx | 301.108.1 |

It should be emphasized that if the destination MAC address is a standard unicast MAC address, this means that the destination is definitely placed locally in the same switch connected to the source host. In this case the frame does not need to get out from the switch which means that it neither generates new MMSP MAC address nor registers it to the MAP-MAC Table.

Phase 4.1: Flood the Frame on the Switch's Edge Port:

Because the destination MAC address of the frame is not an MMSP MAC address (8) (This is a standard broadcast) SW-C does two separate actions:
  a. Flood the frame with no change on all its local edge ports except the ingress one (9). It means all ports except port 1 & 2 & 108.
  b. Forward the frame to every other switch by doing some changes (10-16).

Phase 4.2: Forward the Frame to all Other Switches

It is time to deliver the frame to all other switches and their ports inside the network domain. Actually, this step is little different than the FabricPath procedure. In the FabricPath method, SW-C encapsulates the frame and sends out to the core switches SW-A & SW-B and then these switches SW-A and SW-B flood the frame to all access switches SW-C, SW-D and SW-E. But in our solution this process is improved by delivering the frame to all other switches as a unicast frame.

To achieve this:
  a. We know there are exactly four other switches in our domain (10), (11). So, the switch creates four copies of the original frame (12).
  b. The switch creates four individual MMSP broadcast MAC addresses, one for every other switch (13).
     The new MMSP destination MAC addresses look like this:

Destined for SW-A:

| MMSP MAC Address 48-bit | | | | |
|---|---|---|---|---|
| 8-bit MMSP Indicator | 6-bit TTL | 9-bit SW-ID | 10-bit Edge Port No. | 15-bit Sub-MAC |
| FF(Hex) | 62 | 305 | F | F |

Destined for SW-B:

| MMSP MAC Address 48-bit | | | | |
|---|---|---|---|---|
| 8-bit MMSP Indicator | 6-bit TTL | 9-bit SW-ID | 10-bit Edge Port No. | 15-bit Sub-MAC |
| FF(Hex) | 62 | 304 | F | F |

Destined for SW-D:

| MMSP MAC Address 48-bit | | | | |
|---|---|---|---|---|
| 8-bit MMSP Indicator | 6-bit TTL | 9-bit SW-ID | 10-bit Edge Port No. | 15-bit Sub-MAC |
| FF(Hex) | 62 | 302 | F | F |

Destined for SW-E:

| MMSP MAC Address 48-bit | | | | |
|---|---|---|---|---|
| 8-bit MMSP Indicator | 6-bit TTL | 9-bit SW-ID | 10-bit Edge Port No. | 15-bit Sub-MAC |
| FF(Hex) | 62 | 303 | F | F |

"F" in the edge port no. field and in the Sub-MAC field means a broadcast to the final destination switches.
  c. Replace the original standard broadcast destination MAC address of the frame with each of these new MMSP broadcast addresses on each frame (14).
  d. Replace the original source MAC address of the frame with the generated MMSP MAC address (15).
     After step c & d the below frames are ready to be send out from MMSP ports based on SW-C IS-IS Table (16).

Destined for SW-A

| L2 | |
|---|---|
| Destination MAC | Source MAC |
| FF.62.305.F.F | FF.62.301.108.1 |

Destined for SW-B

| L2 | |
|---|---|
| Destination MAC | Source MAC |
| FF.62.304.F.F | FF.62.301.108.1 |

Destined for SW-D

| L2 | |
|---|---|
| Destination MAC | Source MAC |
| FF.62.302.F.F | FF.62.301.108.1 |

Destined for SW-E

| L2 | |
|---|---|
| Destination MAC | Source MAC |
| FF.62.303.F.F | FF.62.301.108.1 |

We can see from the above that all the frames have the same source MAC address but an individual destination unicast MAC address.

Phase 5: Receiving a Frame by Transit Switches:

Those switches which receive these frames (1) on their MMSP ports (2) and do not see their SW-ID inside the frame (17) are named transit switches. They forward the frames with no changes towards their destinations by using their IS-IS routing tables (16).

The only change that transit switches do to the frame is to decrement the destination MAC address's TTL entry and update the FCS field.

For instance SW-A is a transit switch when it receives the frame towards SW-D or SW-E.

It should be noted that there is no MAC address learning on transit switches since the frame arrives on their MMSP port.

Phase 6: Receiving the Frame by the Final Destination Switch:

We look at SW-E as an example for a destination switch when the below frame reaches SW-E:

| L2 | |
|---|---|
| Destination MAC | Source MAC |
| FF.61.303.F.F | FF.62.301.108.1 |

SW-E sees its own ID inside the destination MAC address of the frame: 303 (17)

Then SW-E looks at the rest of the MAC address field and sees the "F" which means destination MAC is not a MMSP unicast MAC address (18).

Phase 7: Flooding the Frame by the Destination Switch (SW-E)

Actually, it is a MMSP broadcast MAC address and the switch needs to flood it on all its edge ports but the procedure here is different compared to the standard switching procedure. In the standard procedure, the broadcast frame should be floods on all ports except the ingress one but in MMSP the frame should be flooded just on all edge ports (20). It means all ports on SW-E except Port 1 & 2.

But before the switch floods the frame on all its edge ports, the MMSP destination MAC address field should be replaced with a standard broadcast frame as shown below (19):

| L2 | |
|---|---|
| Destination MAC | Source MAC |
| FF:FF:FF:FF:FF:FF | FF.62.301.108.1 |

This ARP request reaches to Host-Z.

Phase 8: Sending ARP Reply by Host-Z to Host-X

Now Host-Z wants to answer to this ARP request by generating the below frame as an ARP reply to Host-X:

| L2 | |
|---|---|
| Destination MAC | Source MAC |
| FF.62.301.108.1 | zz:zz:zz:zz:zz:zz |

It should be noted that the destination MAC address is not the original MAC address of the Host-X. Host-Z instead uses the one as it was in the arrived frame.

Phase 9: SW-E Receives the ARP Reply

When the above frame arrives to SW-E (1), as it came from an edge port (2), SW-E should insert the source MAC address of the frame into its MAP-MAC address table since it is not in the MAC table.

SW-E registers the address in its table as below:

| SW-C MAP-MAC Address Table | | |
|---|---|---|
| Port | Original MAC | MAP MAC |
| 15 | zz:zz:zz:zz:zz:zz | |

Phase 10: Forwarding the Frame to Host-X

Since the destination address is not a standard unicast address (6) SW-C does not need to do any lookup for the destination MAC address.

As the next step, the switch needs to generate a new MMSP source MAC address, register it into its MAP-MAC address and associates it to the original source MAC address of the frame (7).

The new MAP-MAC address looks like this:

| SW-E MAC address Table | | |
|---|---|---|
| Port | Original MAC | MAP MAC |
| 15 | zz:zz:zz:zz:zz:zz | 303:15:1 |

Here is the explanation of this new MMSP MAC address:
303: SW-E's ID
15: Ingress edge port number of the frame
1: Sub-MAC, a new locally significant unique number assigned by switch Because the destination MAC address is an MMSP MAC address (8), SW-E replaces the source MAC address with this new MMSP source MAC address (15):

| L2 | |
|---|---|
| Destination MAC | Source MAC |
| FF.62.301.108.1 | FF.0.303.15.1 |

And then the switch forwards the frame towards the destination by using its IS-IS routing table (16).

Phase 11: Forwarding the Frame by the Transit Switches:
  Those switches which receive these frames (1) on their MMSP ports (2) and do not see their SW-ID inside the frame (17) are named transit switches. They forward the frames with no change toward their destinations by using their IS-IS routing tables (16).
  The only change that transit switches do to the frame is to decrement the destination MAC address's TTL entry and update the FCS field.
  For instance, SW-B is a transit switch when it receives the frame towards SW-D or SW-C.
  It should be noted again that there is no MAC address learning on any switch when the frame arrives on an MMSP port.

Phase 12: Receiving the Frame by the Final Destination Switch, SW-C
  When SW-C receives the frame (1) on its MMSP port (2) and since it can see its own ID in the destination MAC address of the frame (17) SW-C accepts the frame. As the destination MAC address is an MMSP unicast address (18), SW-C needs to do a lookup in its MAP-MAC address (21).
  Here we would like to highlight another advantage of MMSP and this is usage of the edge port number field on the frame. If we look at the destination address again we can see it is: 301.108.1
SW-ID: 301
Edge port number: 108
Sub-MAC address: 1
  Actually, the switch uses this edge port number as an index to search on the MAP-MAC table which is much more efficient compared to doing a top-down search on a large MAC address table. So the switch directly seeks to section 108 and looks for the Sub-MAC address: "1". We can consider the case where in a datacenter, only one single edge port can connect to a server with thousands of virtual machines. So, this index can be a big improvement to do an efficient search on the MAC address table.
  Lookup for 301:108:1 returns a hit (22) as below:

| SW-C MAC address Table | | |
|---|---|---|
| Port | Original MAC | MAP MAC |
| 108 | xx:xx:xx:xx:xx:xx | 301.108.1 |

It should be noted that compared to all other switching technologies, there is no MAC address learning for Host-Z by SW-C since the frame arrives on an MMSP port.

Phase 13. Replace MMSP Destination MAC Address:
  In this step, the switch SW-C should replace the destination MMSP MAC address with the original
  MAC address of the destination Host-X (23). After this replacement the frame looks like this:

| L2 | |
|---|---|
| Destination MAC | Source MAC |
| xx:xx:xx:xx:xx:xx | FF.0.303.15.1 |

Again, we would like to highlight that the source MAC address of the frame is not the original one. But it is still valid for the destination host.

Phase 14: Forward the Frame to the Destination Host:
  As the last step, SW-C forwards the frame on the proper edge port (24) to Host-X.

Highlight Points of MMSP Advantages:
  The following advantages of MMSP in comparison with other switching methods include.
  MMSP uses standard model of frame. No additional field or header is needed. So it causes less bandwidth usage in domain and less process on the switch.
  MMSP MAC address learning method is new by introducing "No MAC Address Learning for Remote Hosts". MAC address learning is a big challenge for all switching techniques. In the standard switching MAC address learning process, switches have to learn the source MAC address of all incoming frame either local or remote hosts. And all switches in the network should know about all available MAC addresses in the network domain. It is more or less the same in FabricPath or Cisco ACI fabric method. But the MMSP MAC address learning is done just for local hosts when a frame arrives from an edge port. So, there is no need for any switches in the network to keep the record for any remote host's MAC address in its MAC address table. It means less processing and resource usage and a much faster transmission.
  Further, in the standard switching procedure, a MAC address lookup for a destination host is mandatory. Even in the FabricPath technology, before sending frame toward a destination host, the switch device needs to look up the destination switch ID and the destination "local-ID" (edge port number for destination host). But in MMSP, since all the information including the destination switch-ID and the destination port number is already part of the destination MAC address, there is no need for any lookup process and the frame is sent out directly. Again, less and faster processing and transmission by MMSP.
  Unknown-unicast refers to a destination node's MAC address that the switch cannot find it in its MAC address table. In such a situation, a switch must broadcast the frame. Another advantage in MMSP is that, based on its characteristic, the unknown-unicast frame is just valid inside a switch. In other words, no unknown-unicast frame broadcast out from the switch is required toward other switches. It means less broadcasting and much faster transmission.
  The searching MAC address table is also improved in MMSP. In current methods, since it is not possible to keep the MAC addresses entries in the table in a structured way, a top-to-bottom search has to be done to find a MAC address in the table. However, in MMSP, by having the "port number" field, the search mechanism significantly improves by seeking directly to the specific section. Again, it results in less processing and a faster process.

It's true that MMSP uses a new field in the MAP-MAC address table. But still in comparison with other switching techniques it uses less resources. Especially when there is no need to have record for remote hosts.

MMSP uses less process/resources when compared with FabricPath. MMSP has its own process to generate, associate, and replace the MMSP MAC address. However, MMSP requires less processing compared with FabricPath to lookup different parts of the Fabricpath header and do an encapsulation/de-encapsulation process.

FabricPath also has to keep some additional information for each destination host like a remote switch ID, sub-switch ID, and local ID, port number and so on while in MMSP all this information is already part of MMSP MAC address, which means less usage of resources.

There is no real broadcast frame anymore in the MMSP domain even for the ARP (Address Resolution Protocol)

As an additional example, let's assume that a communication between Host-X as a source and Host-Z as a destination is ongoing and SW-C has already generated a mapped-MAC address for Host-X and registered it in its Map-MAC address table.

| SW-C MAP-MAC address Table | | |
| --- | --- | --- |
| Port | Original MAC | MAP MAC |
| 108 | xx:xx:xx:xx:xx:xx | 301:108:1 |
| 109 | aa:aa:aa:aa:aa:aa | 301:109:1 |
| 110 | bb:bb:bb:bb:bb:bb | 301:110:1 |

Host-Z also has this Mapped-MAC address as the Host-X's destination MAC address in its local ARP table to generate a frame towards Host-X.

| L2 | |
| --- | --- |
| Destination MAC | Source MAC |
| FF.62.301.108.1 | zz:zz:zz:zz:zz:zz |

Now we are in this situation that Host-Z sends a frame to Host-X and for some reasons, the Host-X's MAC address entry is not present any more in SW-C's Map-MAC address table.
A) One reason can be that the Map-MAC address table of the SW-C gets full, and an overwrite process replaces the Host-X's MAC addresses with a new MAC address like dd:dd:dd:dd:dd:dd.

| SW-C MAP-MAC address Table | | |
| --- | --- | --- |
| Port | Original MAC | MAP MAC |
| 112 | dd:dd:dd:dd:dd:dd | 301:112:1 |
| 109 | aa:aa:aa:aa:aa:aa | 301:109:1 |
| 110 | bb:bb:bb:bb:bb:bb | 301:110:1 |

For two main reasons, technically, one does not expect such a situation:
First the MAC-address table size in the current switches is very big. Usually it is bigger than the expected connected hosts to a switch. So, the replacement process should not happen because of lack of space.
Second, it may happen that the Host-X's MAC entry expires in the MAC address table (for example, after 5 minutes) and SW-C removed it from its MAC address table. If this happens it means that during this time, there was no request for Host-X by any other hosts. If this is the case, then the ARP cash timer should get expired in Host-Z's local ARP cash and Host-Z also needs to send a new ARP request to find out the Host-X's Mac address for any new communication.

But still one would want to address this issue as below. This is referred to as the "On behalf of ARP request" solution:

If SW-C receives a frame from one of its MMSP ports which, in the destination MAC address of the frame does not exist anymore in its Map-MAC address table, SW-C keeps the frame and generates an ARP request by itself to find out the right destination host. Usually one expects to send any ARP request as a broadcast but in MMSP as the port number of the destination (Host-X) is already included in the MMSP MAC address (301:108:1), SW-C just sends that ARP request to that specific port which in our example is port 108.

In this case, Host-X replies to the ARP request and now SW-C knows what the real MAC address of Host-X is. Then, SW-C inserts the real MAC address in its mapped-MAC address table and does the rest of the procedure, as usual, including replacing the MMSP MAC address with the real MAC address of Host-X and sending the frame to the Host-X.

This process is very similar to the "Phase 7: Flooding frame by destination switch" but this time the ARP request is sent to a specific port instead of flooding the request on all ports.

B) Another reason can be that the switch's MAC address table gets flushed. It can happen if, for example, the switch get reloaded.

| SW-C MAP-MA address Table | | |
| --- | --- | --- |
| Port | Original MAC | MAP MAC |

The solution here is as in the normal procedure, i.e., the switch starts to complete its MAC address table based on the arriving frame from its edge ports but for a certain amount of time, for instance, 5 minutes, the switch doesn't look-up a MAC address for those arriving frames from its MMSP's ports.

During this period the switch again uses the "On behalf of ARP request" process to find out the real destination host's MAC address for each frame. The reason for doing this is because the old Mapped-MAC address which the remote hosts are referring to are not valid and do not exist anymore on the switch.

The advantages of the "On behalf of ARP" solution in both situations are:
The process is transparent from remote hosts (Host-Z for instance).
There is no need to discard the frame by a switch and ask remote hosts to re-send the frame.
The "On behalf of ARP request" is a unicast process and not a broadcast one.

Figure 3:
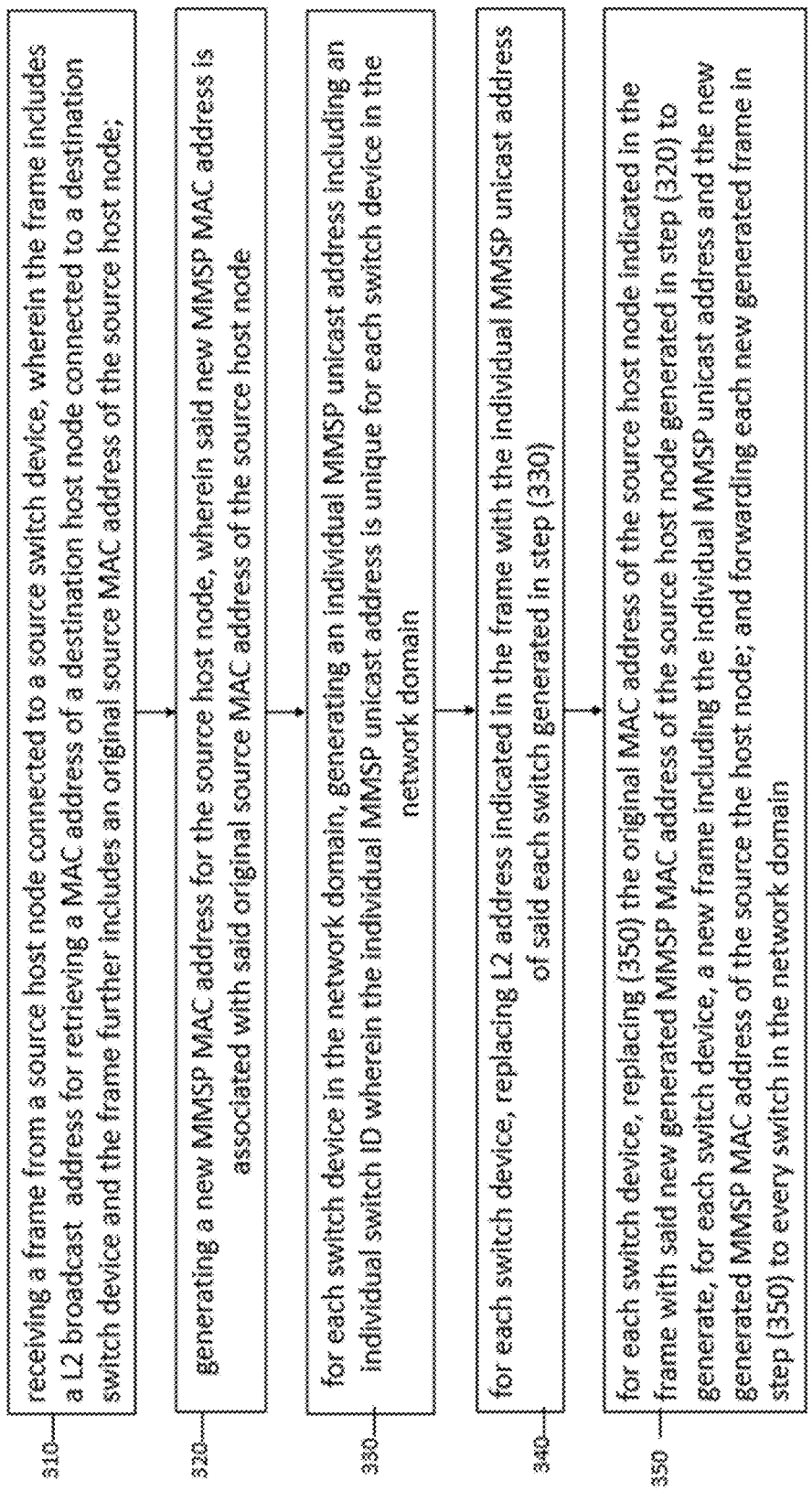
FIG. 3 is a flowchart of a method performed by a source switch device according to embodiments herein.

Referring to FIG. 3 there is illustrated some of the main steps performed according to some embodiments herein and with reference to claim 1.

The method for switching frames in a network domain or network topology including a plurality of switch devices, comprises:

(310) receiving a frame from a source host node connected to a source switch device, wherein the frame includes a Layer 2 broadcast address for retrieving a MAC address of a destination host node connected to a destination switch device and the frame further includes an original source MAC address of the source host node;

(320) generating a new MMSP MAC address for the source host node, wherein said new MMSP MAC address is associated with said original source MAC address of the source host node;

(330) for each switch device in the network domain, generating an individual MMSP unicast address including an individual switch ID wherein the individual MMSP unicast address is unique for each switch device in the network domain;

(340) for each switch device, replacing the destination MAC address indicated in the frame with the individual MMSP unicast address of said each switch generated in step (330);

(350) for each switch device, replacing (350) the original MAC address of the source host node indicated in the frame with said new generated MMSP MAC address of the source host node generated in step (320) to generate, for each switch device, a new frame including the individual MMSP unicast address and the new generated MMSP MAC address of the source the host node; and forwarding each new generated frame in step (350) to every switch in the network domain.

As previously described and according to an exemplary embodiment, all the generated new frames, one for each switch device in the network domain, have the same new MMSP MAC address of the source host node but an individual MMSP unicast address as a destination address.

According to other exemplary embodiment, there is provided, as previously described, a method performed by a transit switch device, the method comprising: receiving a frame generated according embodiments disclosed herein (and claim 1 or claim 2); if the individual switch ID indicated in the received frame does not match the switch ID of the switch device receiving the frame; decrementing a destination MAC address destination's Time-to-Live, TTL, entry and updating a FCS, Frame Check Sequence, field, and forwarding the frame towards the destination switch having the same switch ID as the switch ID indicated in the frame.

According to another embodiment, there is provided a method performed by a destination switch device, the method comprising: receiving, by a destination switch device, a frame generated according to embodiments disclosed herein (and claim 1 or claim 2); if the individual switch ID indicated in the received frame does match the switch ID of the switch receiving the frame; replacing the individual MMSP MAC address field in the received frame with a standard broadcast MAC address; and flooding the frame including the standard broadcast MAC address and the MMSP MAC address of the source host node to all host nodes connected to the switch device.

According to an embodiment, the method comprises, receiving, by the destination switch device, form a destination host node connected to the destination switch device, a frame including as destination MAC address said MMSP MAC address of the source host node and as source MAC address the MAC address of the destination host node; inserting the source MAC address of the frame into a MAP-MAC address table if not already there; generating a new MMSP source MAC address and associate it to the source MAC address indicated in the frame, wherein the new MMSP source MAC address includes the switch ID of the destination switch device; an ingress edge port number of the frame and a locally significant unique number assigned by the destination switch device; replacing the new MMSP source MAC address with the original source MAC address of the frame, and forwarding the frame towards the source switch device.

The method further comprises: when said another destination switch device receives the frame, and if the switch ID indicated in the received frame is that of said another destination switch device, using the edge port number indicated in the received frame as an index to search in a MAP-MAC table of the switch; replacing the destination MMSP MAC address with the original MAC address of the destination host node and delivering the frame to the destination host node.

As previously described, there is also provided a source switch device comprising a processor and a memory, said memory containing instructions executable by said processor whereby said source switch device is operative to perform embodiments disclosed herein (including the subject-matter of any of claims 1-2).

There is also provided a transit switch device comprising a processor and a memory, said memory containing instructions executable by said processor whereby said transit switch device is operative to perform embodiments disclosed herein (including the subject-matter of claim 3).

There is also provided a destination switch device comprising a processor and a memory, said memory containing instructions executable by said processor whereby said destination switch device is operative to perform the embodiments disclosed herein (including the subject-matter of any of claims 4-6).

There are also provided a computer program comprising instructions which when executed on at least one processor of a source switch device, cause the at least said one processor to carry out the methods or procedures previously described.

There are also provided a computer program comprising instructions which when executed on at least one processor of a transit switch device, cause the at least said one processor to carry out the methods or procedures previously described.

There are also provided a computer program comprising instructions which when executed on at least one processor of a destination switch device, cause the at least said one processor to carry out the methods or procedures previously described.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless or wireless systems including GSM, 3G or WCDMA, LTE or 4G, LTE-A (or LTE-Advanced), 5G, WiMAX, WiFi. The embodiments may be employed in any data center.

The invention claimed is:

1. A method performed in a source switch device, for switching frames in a network domain or a network topology including a plurality of switch devices, the method comprising:
   receiving a frame from a source host node connected to the source switch device, wherein the frame includes a Layer 2 broadcast address for retrieving a MAC address of a destination host node connected to a destination switch device, the frame further including an original source MAC address of the source host node;
   generating a new Mapped Medium Access Control Switching Protocol (MMSP) MAC address for the source host node, wherein said new MMSP MAC address is associated with said original source MAC address of the source host node;
   for each switch device in the network domain, generating an individual MMSP unicast address including an individual switch ID, wherein the individual MMSP unicast address is unique for each switch device in the network domain;
   for each switch device, replacing the Layer 2 broadcast address indicated in the frame with the individual MMSP unicast address of said each switch device;
   for each switch device, replacing the original MAC address of the source host node indicated in the frame with said new generated MMSP MAC address of the source host node to generate, for each switch device, a new frame including the individual MMSP unicast address and the new generated MMSP MAC address of the source the host node, wherein all the generated new frames, one for each switch device in the network domain, have the same new MMSP MAC address of the source host node but an individual MMSP unicast address as a destination MAC address; and
   forwarding each new generated frame to every switch device in the network domain.

2. A method performed in a transit switch device, for switching frames in a network domain including a plurality of switch devices, the method comprising:
   receiving a frame from a source switch device connected to the transit switch device, wherein the frame includes an individual Mapped Medium Access Control Switching Protocol (MMSP) unicast address, wherein the MMSP unicast address includes an individual switch ID, the frame further including an MMSP MAC address of a source host node connected to the source switch device, generated by the source switch device;
   if the individual switch ID indicated in the received frame does not match a switch ID of the transit switch device receiving the frame:
      decrementing a destination MAC address destination's Time-to-Live (TTL) entry and updating a Frame Check Sequence (FCS) field; and
      forwarding the frame towards a destination switch having the same switch ID as the switch ID indicated in the frame.

3. A method performed in a destination switch device, for switching frames in a network domain including a plurality of switch devices, the method comprising:
   receiving a frame from a source switch device connected to a source host node, wherein the frame includes an individual Mapped Medium Access Control Switching Protocol (MMSP) unicast address, wherein the MMSP unicast address includes an individual switch ID, the frame further including an MMSP MAC address of the source host node connected to the source switch device, generated by the source switch device;
   if the individual switch ID indicated in the received frame does match a switch ID of the switch device receiving the frame;
      replacing the individual MMSP unicast MAC address field in the received frame with a standard broadcast MAC address; and
      flooding the frame including the standard broadcast MAC address and the MMSP MAC address of the source host node to all host nodes connected to the destination switch device.

4. The method according to claim 3, further comprising:
   receiving, by the destination switch device, from a destination host node connected to the destination switch device, a frame including as a destination MAC address said MMSP MAC address of the source host node and as a source MAC address the MAC address of the destination host node;
   inserting the source MAC address of the frame into a MAP-MAC address table if not already there;
   generating a new MMSP source MAC address and associate it to the source MAC address indicated in the frame, wherein the new MMSP source MAC address includes the switch ID of the destination switch device, an ingress edge port number of the frame, and a locally significant unique number assigned by the destination switch device;
   replacing the original source MAC address of the frame with the new MMSP source MAC address, and
   forwarding the frame towards a source switch device.

5. The method according to claim 4, wherein, when the source switch device receives the frame, and if the switch ID indicated in the received frame is that of said source switch device, the method further comprising:
   using the edge port number indicated in the received frame as an index to search in a MAP-MAC table of the switch device;
   replacing the destination MMSP MAC address with the original MAC address of the destination host node; and
   delivering the frame to the destination host node.

6. A source switch device comprising a processor and a memory, said memory containing instructions executable by said processor whereby said source switch device is operative to:
   receive a frame from a source host node connected to the source switch device, wherein the frame includes a Layer 2 broadcast address for retrieving a MAC address of a destination host node connected to a destination switch device, the frame further including an original source MAC address of the source host node;
   generate a new Mapped Medium Access Control Switching Protocol (MMSP) MAC address for the source host node, wherein said new MMSP MAC address is associated with said original source MAC address of the source host node;
   for each switch device in the network domain, generate an individual MMSP unicast address including an individual switch ID, wherein the individual MMSP unicast address is unique for each switch device in the network domain;
   for each switch device, replace the Layer 2 broadcast address indicated in the frame with the individual MMSP unicast address of said each switch device;
   for each switch device, replace the original MAC address of the source host node indicated in the frame with said new generated MMSP MAC address of the source host node to generate, for each switch device, a new frame including the individual MMSP unicast address and the new generated MMSP MAC address of the source the host node wherein all the generated new frames, one for each switch device in the network domain, have the same new MMSP MAC address of the source host node but an individual MMSP unicast address as a destination MAC address; and forward each new generated frame to every switch device in the network domain.

7. A transit switch device comprising a processor and a memory, said memory containing instructions executable by said processor whereby said transit switch device is operative to:

receive a frame from a source switch device connected to the transit switch device, wherein the frame includes an individual Mapped Medium Access Control Switching Protocol (MMSP) unicast address, wherein the MMSP unicast address includes an individual switch ID, the frame further including an MMSP MAC address of a source host node connected to the source switch device, generated by the source switch device;

if the individual switch ID indicated in the received frame does not match a switch ID of the transit switch device receiving the frame:
  decrement a destination MAC address destination's Time-to-Live (TTL) and updating a Frame Check Sequence (FCS) field; and
  forward the frame towards a destination switch having the same switch ID as the switch ID indicated in the frame.

8. A destination switch device comprising a processor and a memory, said memory containing instructions executable by said processor whereby said destination switch device is operative to:

receive a frame from a source switch device connected to a source host node, wherein the frame includes an individual Mapped Medium Access Control Switching Protocol (MMSP) unicast address, wherein the MMSP unicast address includes an individual switch ID, the frame further including an MMSP MAC address of the source host node, generated by the source switch device;

if the individual switch ID indicated in the received frame does match a switch ID of the switch device receiving the frame;

replace the individual MMSP MAC address field in the received frame with a standard broadcast MAC address; and flood the frame including the standard broadcast MAC address and the MMSP MAC address of the source host node to all host nodes connected to the destination switch device.

* * * * *